May 6, 1941.  F. MENTO  2,241,149
TROLLEY SYSTEM FOR STREETCARS AND OTHER ELECTRIC CARS
Filed June 8, 1939
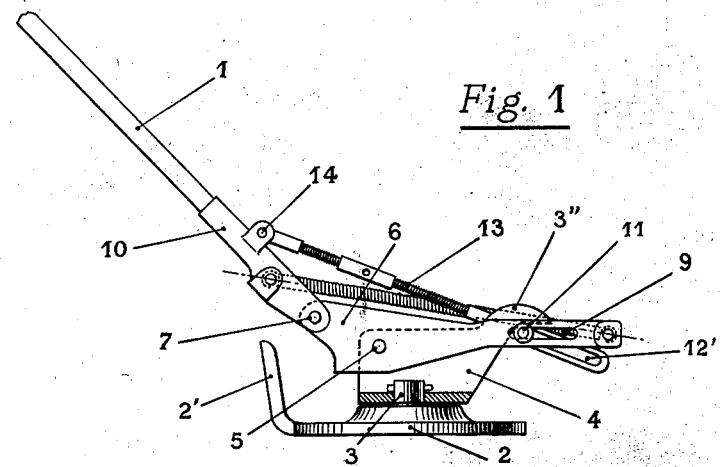
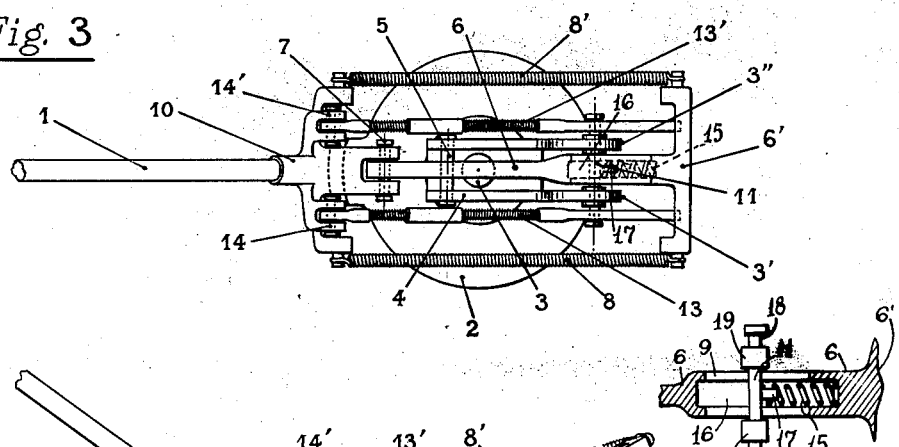
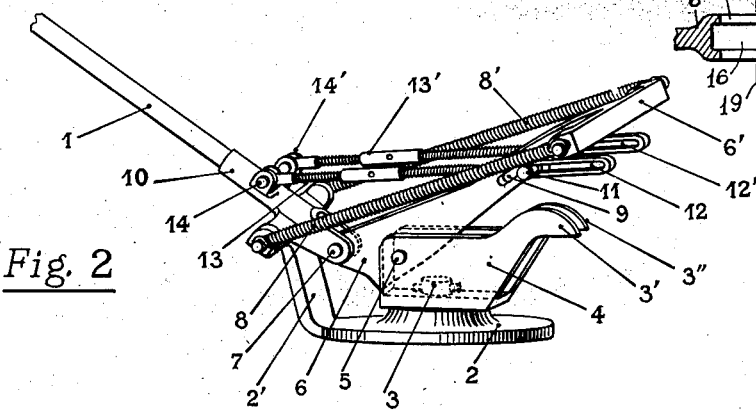
Inventor,
Francesco Mento
J. Friedman
Attorney.

UNITED STATES PATENT OFFICE 2,241,149

TROLLEY SYSTEM FOR STREETCARS AND OTHER ELECTRIC CARS

Francesco Mento, Milan, Italy

Application June 8, 1939, Serial No. 278,026
In Italy June 9, 1938

4 Claims. (Cl. 191—88)

The invention relates to trolley systems for electrically driven cars, such as street cars, and more particularly to an improved type of supporting base of the trolley, which is capable of avoiding the inconveniences of the bases known until now.

It is known that one of the principal inconveniences of the usual trolley systems is the striking of the trolley arm against the overhead-line wire, when the trolley jumps off the line.

One of the objects of the present invention is the provision of a trolley system, in which the connection of the trolley arm with the upper part of the car is realized by means of a system which causes the trolley to fall through gravity, when it jumps off; thereby rendering the striking of the trolley arm against the wires improbable.

Another object of this invention is the provision of a trolley base, which presents the above said improvements and is at the same time simple and inexpensive to manufacture.

The novel features that are considered characteristic of the present invention, are set forth in the appended claims. The invention itself, however, will be best understood, both as to structure and operation, from the following detailed description of one preferred embodiment of the invention, when read in connection with the accompanying drawing, in which:

Fig. 1 is an elevation, partly in section, showing the trolley base in normal position in which the front spring is taken off and a U-shaped member is longitudinally sectioned in order to show the middle part of the trolley base more clearly.

Fig. 2 is a perspective view showing the same device, but with the different parts in the position they take following the jumping off;

Fig. 3 is a plan view of the device shown in Fig. 1.

Fig. 4 is a sectional view showing the operation of the spring provided in member 6.

Referring to the drawing, the reference numeral 1 designates the trolley, 2 is the base plate fixed upon the car roof, 3 is the pivot supported by the plate 2 and upon which the member 4 is mounted, so as to turn about the axis of said pivot; this member 4, in side elevational view, has the shape shown in Figs. 1 and 2, and in front elevational view it is U-shaped; and is precisely its lower horizontal portion which is engaged with the pivot 3. A movable member 6 is pivotally connected to the member 4 by means of the pivot pin 5. Said member 6 is connected also with the trolley holder 10 by means of the pivot pin 7, whilst at its other end, seen in a plan view, it is T-shaped. The member 6 is also connected with the trolley arm holder 10, by means of the two springs 8 and 8', held on one side by two pins projecting from the member 10, and on the other side by analogue pins supported by the transversal portion 6' of the member 6.

Said member 6 bears also a pivot 11 sliding within a longitudinal slot 9; said pivot 11 is pressed in the direction away from the portion 6' by a spring placed inside the piece 6. This cylindrical spring 15 acts upon pivot 11 which is provided in a suitably formed cavity 16 provided in this member 6. This spring is kept in its position pressed against the pivot 11 by means of the projection 17 fixed to the pivot 11 and surrounded by spring 15. This pivot 11 is also provided with suitable cylindrical surfaces 19 to be engaged by the parallel noses 3' and 3'' of the member 3. It is furthermore provided with extremities e. g. cylindrical surfaces 18 of a smaller diameter adapted to engage the slotted members 12 and 12'.

As pointed out above, each of these extremities 18 of the pivot 11 is slidingly engaged in a slotted member 12 and 12' respectively. Said slotted members 12 and 12' are connected with the bars 13 and 13' pivoted on the pins 14 and 14' carried by the trolley arm holder 10. Said pivot 11 is also provided with suitable cylindrical surfaces 19 to be engaged by the parallel noses 3' and 3'' of the member 3, when the whole is in the normal position shown in Fig. 1. When the trolley jumps off, the springs 8 and 8' pull the trolley arm 1 towards the member 6', so as to move the bars 13 and 13' forward, and then the slotted members 12 and 12' being engaged with the pivot 11, will force said pivot to slide on the lower surfaces of the noses 3' and 3'', as far as to disengage it from the said noses 3' and 3''; then, the whole comprising the member 6, the trolley arm holder 10, together with the trolley 1 and the bars 13 and 13', rotate about the pivot 5, under the action of the force of gravity, and the trolley arm 1 falls as much as the supporting member 2' allows, as shown in Fig. 2, in which position, however, the trolley can no longer strike against the line wire. The other members take as well the relative position shown in Fig. 2.

In order to provide for engaging again the trolley arm with the line wire, the trolley will be pulled downwards, by means of the ordinary rope; in consequence the member 6 is caused to rotate again about the pivot 5, until the pivot 11 gets sustained by the upper surfaces of the noses 3' and 3'', and, as the pulling action on the trolley is continued, said pivot will be sliding forward on the said noses, against the biasing action of the inner spring, as far as to arrive at the free extremity of said noses. In this position the said spring is no longer hindered by any force; therefore it pushes the pivot 11 under the noses 3' and 3'', whilst the springs 8 and 8' force the trolley 1 to rise and get engaged again with the wire, whilst all the different members return into the position shown in Fig. 1. The supporting member 2' may also be rendered slightly elastic by means of springs or elastic joints, in order to render the shock of the trolley arm 1 upon said support less sudden. Although the disclosure of the above is that of the preferred embodiment, it will be readily understood that the invention is susceptible to considerable modification and change and comprehends other details without departing from the spirit of the invention defined in the following claims.

What I claim is:

1. In a trolley system the combination of a trolley arm with: a fixed base plate; a pivoted member mounted upon said plate, so as to rotate about a vertical axis; a lever pivoted horizontally upon said member and hinged to the lower extremity of the trolley arm, said lever being connected to the trolley arm also by two tension springs, and being provided with a pivot sliding in a longitudinal slot provided in this same lever, and biassed by a spring towards the extremity connected with the trolley arm, said sliding pivot being adapted to get engaged with the member pivoted upon the base plate; two drawbars, the one end of which is hinged to the trolley arm at a point above the connecting points of the tension springs, whilst the other end of each of them is provided with a slotted member engaged with the pivot mounted in the slot of the said lever; and a suitable fixed support for the trolley arm, when it falls through gravity.

2. In a trolley system the combination of a trolley arm with: a fixed base plate, provided with a supporting member for the trolley arm, when this latter falls to a prefixed position; a member pivoted upon said plate, so as to rotate about a vertical axis; a lever pivoted horizontally upon said member and hinged to the lower extremity of the trolley arm, said lever being connected to the trolley arm also by two tension springs, and being provided with a pivot sliding in a longitudinal slot provided in this same lever, and biassed by a spring towards the extremity connected with the trolley arm, said sliding pivot being adapted to get engaged with the member pivoted upon the base plate; and two drawbars, one end of which is hinged to the trolley arm at a point above the connecting points of the tension springs, whilst each of their other ends is provided with a slotted member engaged with the pivot mounted in the slot of said lever.

3. In a trolley system the combination of a trolley arm with: a fixed base plate; a fixed supporting member for the said arm, when this latter is falling and taking a prefixed position; a U-shaped member pivoted upon said plate with its horizontal portion, so as to rotate about a vertical axis, the lateral portions of said member being provided with a hook-shaped nose, projecting from the side opposed to the trolley; a lever pivoted horizontally upon said member and hinged to the lower extremity of the trolley arm, said lever being connected to the trolley arm also by two tension springs, and being provided with a pivot sliding in a longitudinal slot provided in this same lever, and biassed through a spring towards the extremity connected to the trolley arm, said sliding pivot being adapted to get engaged in normal position with the hook-shaped nose of said member; and two drawbars, the one end of which is hinged to the trolley arm at a point above the connecting points of the tension springs, whilst the other end of each of them is provided with a slotted member engaged with the pivot mounted in the slot of said lever.

4. In a trolley system the combination of a trolley arm with: a fixed base plate; a member pivoted upon said plate, so as to rotate about a vertical axis; a lever pivoted horizontally upon said member and hinged to the lower extremity of the trolley arm, said lever being connected to the trolley arm also by two tension springs, and being provided with a pivot sliding in a longitudinal slot, provided in this same lever, and biassed by a spring towards the extremity connected with the trolley arm, said sliding pivot being adapted to get engaged with the member pivoted upon the base plate; two drawbars, the one end of which is hinged to the trolley arm at a point above the connecting points of the tension springs, whilst at each of their other ends a slotted member is provided and engaged with the pivot mounted in the slot of said lever, and a slightly elastic supporting member fixed to the base plate and adapted to sustain the trolley arm, when this latter is falling and getting into a prefixed position, or when it is pulled downward to cause the resetting of the trolley arm actuating means.

FRANCESCO MENTO.